United States Patent
Chu et al.

(10) Patent No.: US 6,723,140 B2
(45) Date of Patent: *Apr. 20, 2004

(54) PLATING METAL NEGATIVE ELECTRODES UNDER PROTECTIVE COATINGS

(76) Inventors: May-Ying Chu, 6069 Fairlane Dr., Oakland, CA (US) 94611; Steven J. Visco, 2336 California St., Berkeley, CA (US) 94703; Lutgard C. De Jonghe, 910 Acalanes Rd., Lafayette, CA (US) 94549

( * ) Notice: Subject to any disclaimer, the term of this patent is extended or adjusted under 35 U.S.C. 154(b) by 201 days.

This patent is subject to a terminal disclaimer.

(21) Appl. No.: 09/901,970

(22) Filed: Jul. 9, 2001

(65) Prior Publication Data

US 2001/0041294 A1 Nov. 15, 2001

Related U.S. Application Data

(63) Continuation of application No. 09/139,603, filed on Aug. 25, 1998, now Pat. No. 6,402,795.
(60) Provisional application No. 60/075,017, filed on Feb. 18, 1998.

(51) Int. Cl.[7] .................................................. H01M 4/04
(52) U.S. Cl. ................................ 29/623.5; 429/231.95; 429/218.1
(58) Field of Search .................... 429/231.95, 218.1, 429/232, 623.5

(56) References Cited

U.S. PATENT DOCUMENTS

| | | | |
|---|---|---|---|
| 4,162,202 A | 7/1979 | Dey | |
| 4,981,672 A | 1/1991 | de Neufville et al. | |
| 5,100,523 A | 3/1992 | Helms et al. | |
| 5,314,765 A | 5/1994 | Bates | |
| 5,338,625 A | 8/1994 | Bates et al. | |
| 5,342,710 A | 8/1994 | Koksbang | |
| 5,409,786 A | 4/1995 | Bailey | |
| 5,455,126 A | 10/1995 | Bates et al. | |
| 5,512,147 A | 4/1996 | Bates et al. | |
| 5,552,238 A | * 9/1996 | Carlin et al. | ................... 429/50 |
| 5,567,210 A | 10/1996 | Bates et al. | |
| 5,569,520 A | 10/1996 | Bates | |
| 5,597,660 A | 1/1997 | Bates et al. | |
| 5,612,152 A | 3/1997 | Bates et al. | |
| 5,648,187 A | 7/1997 | Skotheim | |
| 5,686,201 A | 11/1997 | Chu | |
| 5,750,289 A | * 5/1998 | Kejha | ........................ 429/233 |
| 6,063,142 A | * 5/2000 | Kawakami et al. | ......... 29/623.5 |
| 6,402,795 B1 | * 6/2002 | Chu et al. | ................... 29/623.5 |

FOREIGN PATENT DOCUMENTS

| | | | |
|---|---|---|---|
| EP | 689 260 | 12/1995 | .......... G01M/10/40 |
| EP | 875 951 | 11/1998 | ............ H01M/4/02 |

OTHER PUBLICATIONS

Linden, Handbook of Batteries, Second Edition, McGraw Hill, 1995.*

(List continued on next page.)

*Primary Examiner*—Carol Chaney

(57) ABSTRACT

A method for forming lithium electrodes having protective layers involves plating lithium between a lithium ion conductive protective layer and a current collector of an "electrode precursor." The electrode precursor is formed by depositing the protective layer on a very smooth surface of a current collector. The protective layer is a glass such as lithium phosphorus oxynitride and the current collector is a conductive sheet such as a copper sheet. During plating, lithium ions move through the protective layer and a lithium metal layer plates onto the surface of the current collector. The resulting structure is a protected lithium electrode. To facilitate uniform lithium plating, the electrode precursor may include a "wetting layer" which coats the current collector.

30 Claims, 6 Drawing Sheets

OTHER PUBLICATIONS

"R&D Thin–Film Technology," Sep., 1997, *R&D Magazine*.

Steven D. Jones, et al., "Thin Film Rechargeable Li Batteries," Ohio/New Jersey, 1994, *Solid States Ionics*.

J.B. Bates, et al., "Thin–Film Rechargeable Lithium Batteries," Tennessee, *Journal of Power Sources*.

N.J. Dudney, et al., "Sputtering of Lithium Compounds for Preparation of Electrolyte Thin Films," 1992, Tennessee, *Solid State Ionics*.

J.B. Bates, et al., "Electrical Properties of Amorphous Lithium Electrolyte Thin Films," 1992, Tennessee, *Solid State Ionics*.

Xiaohua Yu, et al., "A Stable Thin–Film Lithium Electrolyte: Lithium Phosphorus Oxynitride," Feb. 1997, Tennessee, *The Electrochemical Society, Inc.*

* cited by examiner

PLATING METAL NEGATIVE ELECTRODES UNDER PROTECTIVE COATINGS

CROSS-REFERENCE TO RELATED APPLICATIONS

This application is a continuation of U.S. patent application Ser. No. 09/139,603 now U.S. Pat. No. 6,402,795 filed Aug. 25, 1998, which claims the benefit of Provisional application No. 60/075,017 filed Feb. 18, 1998. This application is related to U.S. patent application Ser. No. 09/139,601 filed on Aug. 25, 1998, now U.S. Patent 6,214,061 titled "METHOD FOR FORMING ENCAPSULATED LITHIUM ELECTRODES HAVING GLASS PROTECTIVE LAYERS," and naming Steven J. Visco and Floris Y. Tsang as inventors. This application is also related to U.S. patent application Ser. No. 09/086,665, now U.S. Pat. No. 6,025,094. Each of the above patent applications is incorporated herein by reference for all purposes.

BACKGROUND OF THE INVENTION

This invention relates to negative electrodes for use in batteries (e.g., lithium electrodes for use in lithium-sulfur batteries). More particularly, this invention relates to methods of forming alkali metal electrodes having a thin glassy or amorphous protective layer.

In theory, some alkali metal electrodes could provide very high energy density batteries. The low equivalent weight of lithium renders it particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte which contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various preformed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LIPON") or related material. LIPON is a glassy single ion conductor (conducts lithium ion) which has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

In both the in situ and ex situ techniques for fabricating a protected lithium electrode, one must start with a smooth clean source of lithium on which to deposit the protective layer. Unfortunately, most commercially available lithium has a surface roughness that is on the same order as the thickness of the desired protective layer. In other words, the lithium surface has bumps and crevices as large as or nearly as large as the thickness of the protective layer. As a result, most contemplated deposition processes cannot form an adherent gap-free protective layer on the lithium surface.

Thus, lithium battery technology still lacks an effective mechanism for protecting lithium negative electrodes.

SUMMARY OF THE INVENTION

The present invention provides an improved method for forming active metal electrodes having protective layers. Active metals include those metals that can benefit from a protective layer when used as electrodes. The method involves plating the active metal between a protective layer and a current collector on an "electrode precursor." The electrode precursor is formed by depositing the protective layer on a very smooth surface of a current collector. Because the surface on which the protective layer is deposited is very smooth, the protective layer has a higher quality than when deposited directly on thick lithium metal. During plating, active metal ions move through the protective layer and an active metal layer plates onto the surface of the current collector. The resulting structure is a protected active metal electrode. To facilitate uniform plating, the electrode precursor may include a "wetting layer" which coats the current collector.

One aspect of the invention provides a method of fabricating an alkali metal electrode, which method may be characterized by the following sequence: (a) providing an alkali metal electrode precursor to an electrochemical cell, which electrode precursor includes a current collector and a glassy or amorphous protective layer forming a substantially impervious layer which is a single ion conductor conductive to ions of an alkali metal; and (b) plating the alkali metal through the protective layer to form a layer of the alkali metal between the current collector and the protective layer to form the alkali metal electrode. Preferably, the alkali metal electrode precursor also includes a wetting layer located between and adherent to the current collector and the protective layer. The wetting layer facilitates even deposition of the alkali metal on the current collector. Note that current collectors are typically inert to the alkali metal and therefore do not provide good plating surfaces. Often the alkali metal plates unevenly over the surface. In a preferred embodiment, the wetting layer either (i) intercalates alkali metal ions conducted by the single ion conductor or (ii) alloys with the alkali metal having ions conducted by the single ion conductor.

The alkali metal may be plated in situ or ex situ. In the in situ case, a battery is assembled from the electrode precursor and other battery elements including an electrolyte and a positive electrode. The electrode precursor is then converted to an alkali metal electrode by an initial charging operation in which lithium plates from the positive electrode. The battery may be either a primary or secondary battery. Prior to the plating step, such batteries do not contain free alkali metal. This allows for safe transportation and long shelf life.

Only when a battery cell is ready for use is it charged for the first time to form the alkali metal electrode. Only then does it contain free alkali metal.

In the ex situ case, the electrode is formed in an electrolytic cell that is separate from the battery in which it is ultimately assembled. Thereafter the electrode is removed from the electrochemical cell and assembled into a battery.

The present invention also relates to alkali metal electrode precursors which may be characterized by the following features: (a) a current collector; (b) a glassy or amorphous protective layer forming a substantially impervious layer which is a single ion conductor conductive to ions of an alkali metal; and (c) a wetting layer located between and adherent to the current collector and the protective layer. As mentioned in the method aspect of this invention, the wetting layer either (i) intercalates alkali metal ions conducted by the single ion conductor or (ii) alloys with the alkali metal having ions conducted by the single ion conductor.

The current collector is typically a layer of metal such as copper, nickel, stainless steel, or zinc. Alternatively, it may be a metallized plastic sheet or other metallized insulating sheet. If the wetting layer material alloys with the alkali metal, it may be silicon, magnesium, aluminum, lead, silver, or tin, for example. If the wetting layer intercalates ions of the alkali metal, it may be carbon, titanium sulfide, or iron sulfide, for example.

If the alkali metal is lithium, the protective layer should be conductive to lithium ions. Examples of suitable lithium ion conducting protective layer materials include lithium silicates, lithium borates, lithium aluminates, lithium phosphates, lithium phosphorus oxynitrides, lithium silicosulfides, lithium borosulfides, lithium aluminosulfides, and lithium phosphosulfides. Specific examples of protective layer materials include $6LiI-Li_3PO_4-P_2S_5$, $B_2O_3-LiCO_3-Li_3PO_4$, $LiI-Li_2O-SiO_2$, and $Li_xPO_yN_z$ (LIPON). Preferably, the protective layer has a thickness of between about 50 angstroms and 5 micrometers (more preferably between about 500 angstroms and 2000 angstroms). Preferably, the protective layer has a conductivity (to an alkali metal ion) of between about $10^{-8}$ and about $10^{-2}$ (ohm-cm)$^{-1}$.

As noted, the electrodes and electrode precursors of this invention may be assembled into alkali metal batteries. In a specific embodiment, the invention provides alkali metal batteries that may be characterized by the following features: (a) a positive electrode comprising a source of mobile alkali metal ions on charge; (b) a precursor to an alkali metal negative electrode as described above; and (c) an electrolyte. Preferably, the alkali metal is at least one of lithium and sodium. The electrolyte may be liquid, polymer, or gel. In a particularly preferred embodiment, the positive electrode includes at least one of sulfides of the alkali metal, polysulfides of the alkali metal.

Examples of suitable primary batteries include lithium manganese dioxide batteries, lithium (CF)$_x$ batteries, lithium thionyl chloride batteries, lithium sulfur dioxide batteries, lithium iron sulfide batteries (Li/FeS$_2$), lithium polyaniline batteries, and lithium iodine batteries. Examples of suitable secondary batteries include lithium-sulfur batteries, lithium cobalt oxide batteries, lithium nickel oxide batteries, lithium manganese oxide batteries, and lithium vanadium oxide batteries. Other batteries employing active metals other than lithium may be employed as well. These include the other alkali metals and alkaline earth metals.

These and other features of the invention will be further described and exemplified in the drawings and detailed description below.

DETAILED DESCRIPTION OF THE PREFERRED EMBODIMENTS

Using an Electrode Precursor

In the following description, the invention is presented in terms of certain specific compositions, configurations, and processes to help explain how it may be practiced. The invention is not limited to these specific embodiments. For example, while much of the following discussion focuses on lithium systems, the invention pertains more broadly to other active metal battery systems as well (e.g., batteries having negative electrodes of alkali metals and alkaline earth metals).

Figure 1:
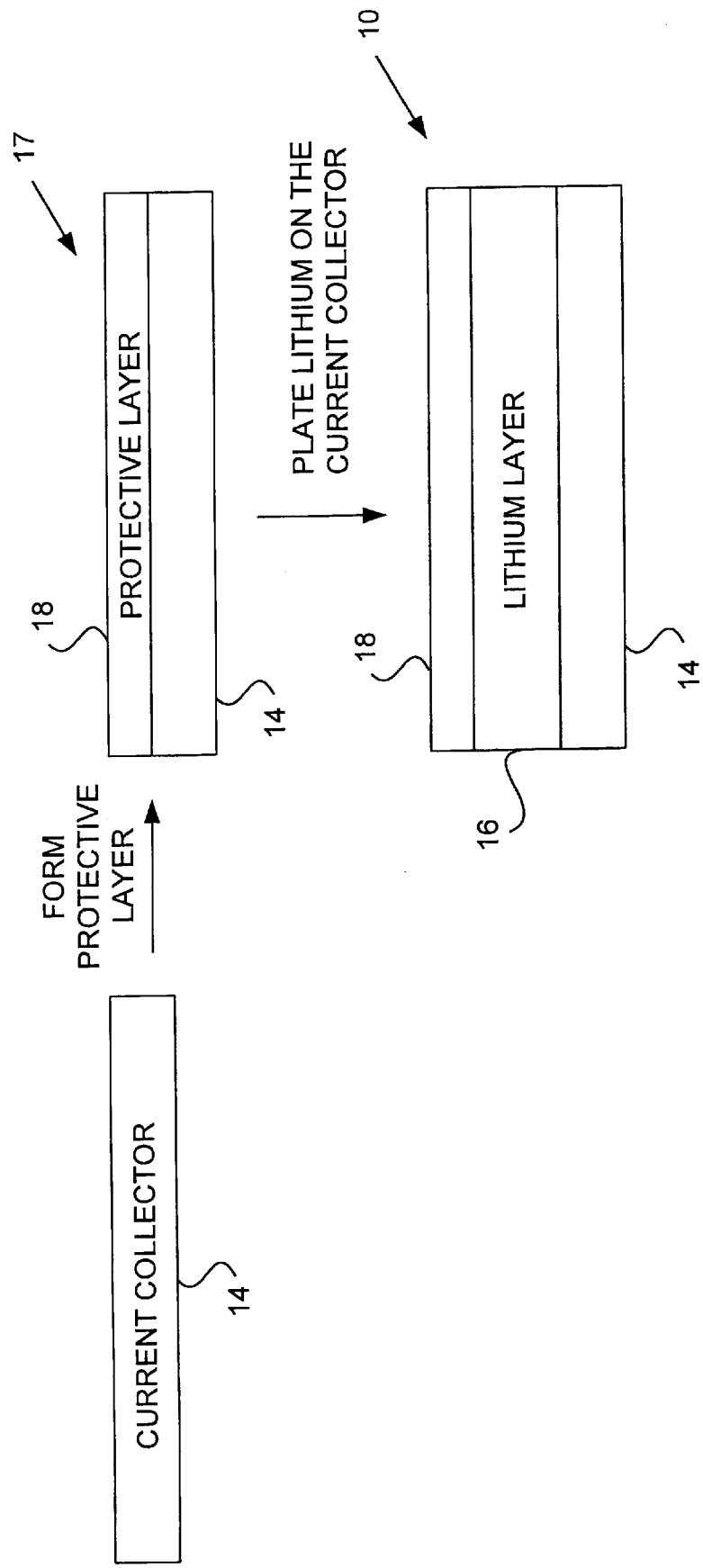
FIG. 1 is a schematic illustration of the steps associated with a first preferred embodiment of the invention including forming an electrode precursor and converting it to an electrode by plating lithium on a current collector.
Figure 2:
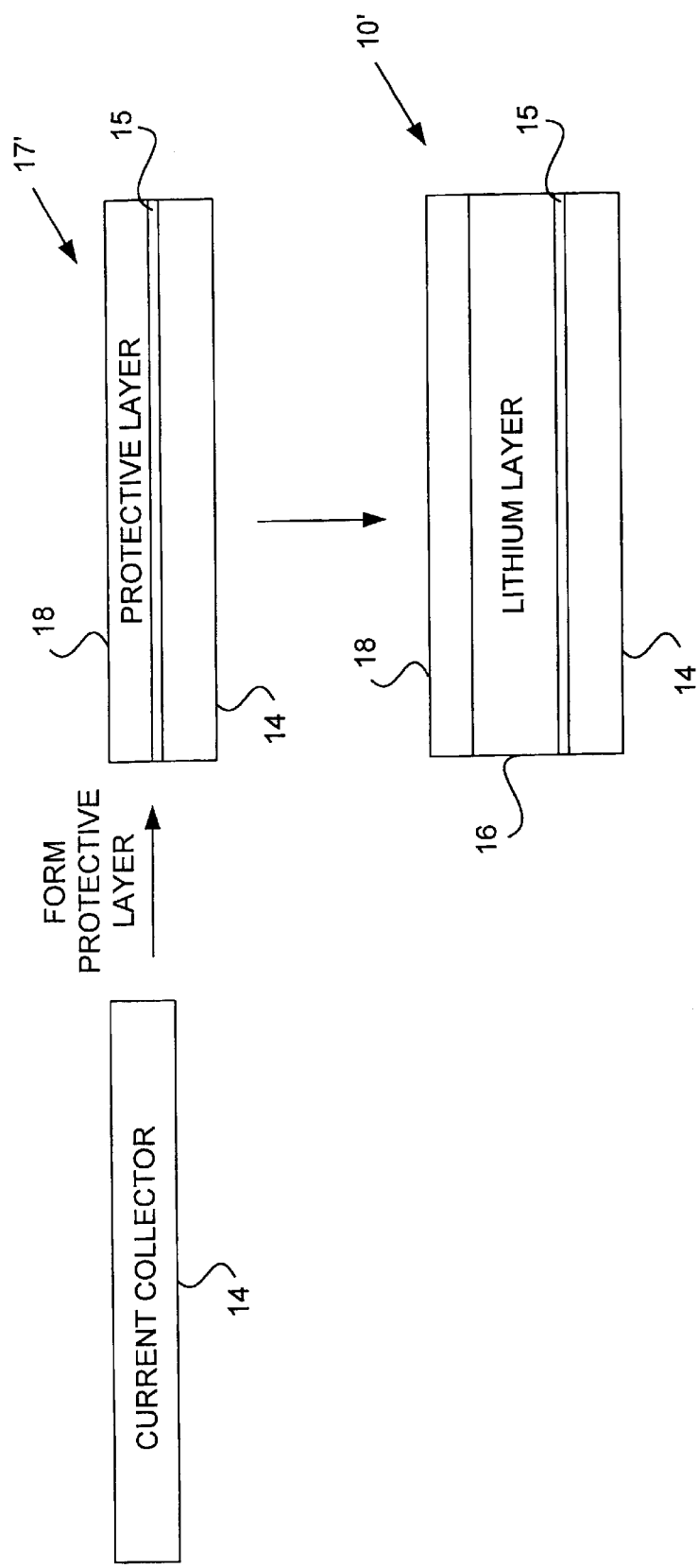
FIG. 2 is a schematic illustration of the steps associated with a second preferred embodiment of the invention including forming an electrode precursor and converting it to an electrode by plating lithium on a wetting layer provided on a current collector.

FIGS. 1 and 2 illustrate two preferred approaches to the present invention. Considering FIG. 1 first, a current collector 14 is provided. This should be a conductive material with at least a top surface that is very smooth. On this smooth surface, a protective layer 18 is formed by a suitable process such as sputtering or chemical vapor deposition. Protective layer 18 should be a single ion conductor which conducts ions of the active metal used in the electrode (e.g., lithium). Because protective layer 18 is deposited on a very smooth surface, it too will be smooth and continuous.

The resulting structure is referred to herein as an "electrode precursor" 17. It may be transported, stored, and otherwise handled without the precautions normally required for a lithium metal electrode.

Finally, lithium metal is electroplated onto current collector 14 from a lithium ion source to produce a lithium electrode 10. Lithium ions move through protective layer 18 and contact current collector 14 where they are reduced to form lithium metal. Thus, electrode 10 includes a lithium metal layer 16 sandwiched between current collector 14 and protective layer 18. Because the lithium layer is formed after the protective layer (rather than having the protective layer formed on the lithium as in conventional processes), the protective layer is of high quality. That is, the protective layer is generally gap-free and adherent when produced according to this invention.

FIG. 2 illustrates another preferred embodiment of the present invention. This approach may be appropriate when the current collector is made from a material that does not allow lithium to plate evenly. Copper current collectors, for example, do not provide good surfaces for plating lithium. Lithium tends to plate on copper in discontinuous patches.

To address this problem, a "wetting layer" may be formed on the current collector to reduce the surface energy at the interface of the plated lithium and the current collector.

As shown in FIG. 2, an electrode precursor 17' is created from current collector 14, protective layer 18, and a wetting layer 15. Note that wetting layer 15 is sandwiched between current collector 14 and protective layer 18. Like electrode precursor 17, electrode precursor 17' may be handled and stored without the special precautions afforded alkali metal electrodes.

An electrode 10' is formed by plating a lithium layer 16 onto wetting layer 15 and current collector 14. Thus, electrode 10' comprises a stack including a current collector as the bottom layer, a single ion conducting protective layer as the top layer, a wetting layer on the current collector, and a lithium metal layer between the wetting layer and the protective layer. Wetting layer 15 may, but need not, integrate into lithium layer 16 during plating. For example, if wetting layer 15 is deposited as a layer of aluminum, it may form a lithium/aluminum alloy when lithium layer 16 is formed.

Note that in both electrodes 10 and 10', current collector 14 includes a first surface which is exposed to the ambient and a second surface which intimately contacts the lithium layer 16 (or possibly wetting layer 15). Lithium layer 16 includes a first surface which forms the interface with current collector 14 (or possibly wetting layer 15) and a second surface which intimately contacts protective layer 18. In turn, protective layer 18 includes a first surface which contacts the second surface of lithium layer 16. Finally, protective layer 18 includes a second surface which is exposed to the ambient. The interfaces at the surfaces of lithium layer 16 should be sufficiently continuous or intimate that moisture, air, electrolyte, and other agents from the ambient are prevented from contacting the lithium metal. In addition, the interface the lithium and the current collector should provide a low resistance electronic contact.

Preferably, the current collectors employed with this invention form a physically rigid layer of material that does not alloy with lithium. They should be electronically conductive and unreactive to moisture, gases in the atmosphere (e.g., oxygen and carbon dioxide), electrolytes and other agents they are likely to encounter prior to, during, and after fabrication of a battery. Examples of materials useful as current collectors for this invention include copper, nickel, many forms of stainless steel, zinc, chromium, and compatible alloys thereof. The current collector should not alloy with, easily migrate into, or otherwise detrimentally affect the electrochemical properties of lithium layer 16. This also ensures that the current collector material does not redistribute during the charge and discharge cycles in which lithium is alternately plated and electrolytically consumed. In a preferred embodiment, the current collector may have a thickness of between about 1 and 25 micrometers (more preferably between about 6 and 12 micrometers).

In an alternative embodiment, the current collector is provided as a metallized plastic layer. In this case, the current collector may be much thinner than a free-standing current collector. For example, the metal layer on plastic may be in the range of 500 angstroms to 1 micrometer in thickness. Suitable plastic backing layers for use with this type of current collector include polyethylene terephthalate (PET), polypropylene, polyethylene, polyvinylchloride (PVC), polyolefins, polyimides, etc. The metal layers put on such plastic substrates are preferably inert to lithium (e.g., they do not alloy with lithium) and may include at least those materials listed above (e.g., copper, nickel, stainless steel, and zinc). One advantage of this design is that it forms a relatively lightweight backing/current collector for the electrode.

In an alternative embodiment, current collector 14 is coated with a non-electronically conductive outer layer such as a second protective layer. In this embodiment, a current collector or terminal must still be affixed to the lithium electrode. This may take the form of a metal tab or other electronically conductive member that extends beyond the protective layers.

The current collector may be prepared by a conventional technique for producing current collectors. For example, current collectors may be provided as sheets of the commercially available metals or metallized plastics. The surfaces of such current collectors may be prepared by standard techniques such as electrode polishing, sanding, grinding, and/or cleaning. At this point, the surface of the current collector should be smoother than the thickness of the protective glass layer subsequently deposited onto it. For example, a current collector with a surface roughness on the order of micrometers might not be suitable for deposition of a 1000 angstrom layer of glass.

Alternatively, the current collector metals may be formed by a more exotic technique such as evaporation of the metal onto a substrate, physical or chemical vapor deposition of the metal on a substrate, etc. Such processes may be performed as part of a continuous process for constructing the electrode. Other sub-processes employed in the continuous process might include subsequent deposition of an aluminum layer (one example of a wetting layer) and a lithium layer. Each step in the continuous process would be performed under vacuum.

While the material comprising the current collector is preferably inert to lithium, this makes it somewhat difficult to deposit a smooth cohesive layer of lithium on the current collector. For this reason, the present invention may employ a layer of "wetting" material on the current collector to facilitate an even deposition of lithium in a subsequent step.

A goal in using the wetting layer of this invention is to prevent the lithium from preferentially plating at one or a few locations where it grows so thick that it cracks the glass protective layer. Thus, during the initial plating cycle, the lithium should plate evenly over the current collector surface to avoid cracking.

The wetting material should be chosen to lower the energy of plating. Various materials may serve this function. Two general classes of suitable materials include (1) the materials that alloy with lithium and (2) materials that intercalate lithium. Examples of materials falling into the first class include silicon, magnesium, aluminum, lead, silver, and tin. Materials falling into the second class include carbon, titanium sulfide ($TiS_2$), and iron sulfide ($FeS_2$).

Regardless of which wetting material is chosen, only a rather small amount of it should be employed. If too much of this material is present, it can effect the electrochemical properties of the electrode. Each of these materials will effect the redox potential of the electrodes. In some embodiments, the wetting layer is between about 50 and 1000 angstroms thick.

The wetting material should be formed with as smooth a surface as possible. The r.m.s. thickness of the beginning layer should be no greater than the anticipated thickness of the glass layer to be subsequently deposited. Suitably smooth layers may be deposited by various processes. Examples of suitable processes include physical vapor deposition (e.g. evaporation or sputtering) of aluminum or magnesium wetting layers. Alternatively, chemical vapor deposition may be used to deposit carbon, silicon, titanium sulfide, and iron sulfide. So long as the thickness of the wetting layers are kept relatively thin, (e.g., within 50 to 1000 angstroms thick), it generally will not get too bumpy.

Preferably, the wetting layer remains in place during successive cycles of the electrode. In most cases, the wetting material will remain behind the protective layer because the protective layer will not be conductive to ions of the wetting layer. For example, if the protective layer is a single ion conductor for lithium and the wetting layer is aluminum, aluminum ions will not pass through the protective layer. Thus, the proper choice of a protective layer and a wetting layer will ensure that the wetting layer does not migrate throughout the cell employing the electrode. In addition, the wetting layer may be "locked" in place within the matrix of the current collector. Stated another way, the current collector may be chemically modified with a wetting material. In a preferred embodiment, this is accomplished by having a graded composition near the surface of the current collector in which the concentration of the wetting layer material increases toward the surface.

Protective layer 18 serves to protect the lithium metal in the electrode during cell cycling. It should protect the lithium metal from attack from the electrolyte and reduce formation of dendrites and mossy deposits. In addition, layer 18 should be substantially impervious to agents from the ambient. Thus, it should be substantially free of pores, defects, and any pathways allowing air, moisture, electrolyte, and other outside agents to penetrate though it to metal layer 16. In this regard, the composition, thickness, and method of fabrication may all be important in imparting the necessary protective properties to layer 18. These features of the protective layer will be described in further detail below.

Preferably, protective layer 18 is so impervious to ambient moisture, carbon dioxide, oxygen, etc. that a lithium electrode can be handled under ambient conditions without the need for elaborate dry box conditions as typically employed to process other lithium electrodes. Because the protective layer described herein provides such good protection for the lithium (or other reactive metal), it is contemplated that electrode 10 (or 10') may have a quite long shelf life outside of a battery. Thus, the invention contemplates not only batteries containing negative electrode 10, but unused negative electrodes themselves. Such negative electrodes may be provided in the form of sheets, rolls, stacks, etc. Ultimately, they are integrated with other battery components to fabricate a battery. The enhanced stability of the batteries of this invention will greatly simplify this fabrication procedure.

The protective layer should be a glass or amorphous material that conducts lithium ion but does not significantly conduct other ions. In other words, it should be a single ion conductor. It should also be stable for the voltage window employed in the cell under consideration. Still further it should be chemically stable to the electrolyte, at least within the voltage window of the cell. Finally, it should have a high ionic conductivity for the lithium ion.

The protective layer may be formed directly on top of the wetting layer by any suitable process. It can be deposited on the wetting layer by techniques such as physical vapor deposition and chemical vapor deposition. In a preferred embodiment, it is deposited by plasma enhanced chemical vapor deposition (PECVD). Examples of suitable physical vapor deposition processes include sputtering and evaporation (e.g., electron-beam evaporation). A PECVD technique is described in U.S. patent application Ser. No. 09/086,665, filed on May 19, 1998, and titled PROTECTIVE COATINGS FOR NEGATIVE ELECTRODES, which was previously incorporated herein by reference.

The lithium or other active material is provided to the electrode electrochemically by electroplating it on the current collector/wetting agent behind the protective layer. This may be accomplished either ex situ or in situ. In the ex situ case, the electroplating takes place in a system that is separate from the final battery or cell in which the electrode is used. Thus, the lithium electrode is preformed before introduction into the battery. In the in situ case, the composite including the current collector, wetting agent, and protective layer is assembled into a battery containing a fully discharged positive electrode. The fully discharged positive electrode contains all the lithium or other metal necessary to cycle the cell. After the cell is assembled, it undergoes a charge cycle in which lithium (or other metal) is driven from the positive electrode and placed onto the negative electrode behind the protective layer.

In the ex situ case, the current collector/wetting agent/protective layer composite is provided to an electrolytic solution containing an electrolyte and a source of lithium ions (e.g., a metallic lithium source). The source of lithium ions and the electrode precursor serve as electrodes and are connected by a current source. If a metallic current collector (i.e., one that does not have an insulating backing such as PET) is used, the exposed face of the metallic current collector must be masked in order to prevent the lithium or other metal from depositing on it. The goal is to ensure that all lithium is plated through the protective layer and onto the side of the current collector having the wetting agent.

The electrolyte is preferably a high conductivity organic solvent. It should be made as conductive as possible to increase the efficiency of the plating operation. The more conductive the material, the less energy required to plate the lithium or other metal onto the composite electrode. Examples of suitable electrolytes might include alkylene carbonates such as dimethyl carbonate, ethylene carbonate and propylene carbonate, ethers such as monoglyme $CH_3(OCH_2CH_2)OCH_3$, diglyme $CH_3(OCH_2CH_2)_2OCH_3$, triglyme $CH_3(OCH_2CH_2)_3OCH_3$, tetraglyme $CH_3(OCH_2CH_2)_3OCH_3$, tetrahydrofuran, and polyethers such as polyethylene oxide, dimethyl sulfoxide, sulfolane, tetraethyl sulfonamide, dimethyl formamide, diethyl formamide, dimethyl acetamide, etc. Other suitable solvents are known in the art. Usually the solvent will include a conductivity enhancing agent, such as lithium trifluoromethylsulfonimide.

During the plating operation, the composite electrode on which the lithium is to be plated is made negative and the source of lithium electrode is made positive. The current is controlled until a defined number of Coulombs are passed. This defined number is set to correspond to the amount of lithium that is to be plated. The current determines how fast the lithium is plated. Preferably, it is plated as fast as possible without causing the protective layer to crack, lose adherence, or otherwise lose its protective function. When possible, it may be desirable to perform the plating operation at a relatively high temperature (e.g., between about 50 and 100 degrees Centigrade) in order to increase electrolyte conductivity and thereby speed the plating process.

In the in situ case, the lithium necessary for forming the negative electrode is obtained from the cathode or catholyte where it may be safely held for long periods of time. In this approach, the cell is constructed essentially the same as it would be with a normal lithium electrode. However, there is no free lithium in the negative electrode prior to the first charge cycle. The completed cell is in the discharged state.

Because there is no free lithium metal present in the fully assembled cell (before the initial charge), such cells may be safely stored for long periods of time and safely transported without reduction of shelf life.

Protective Layer Composition

Protective layer 18 is preferably composed of a glass or amorphous material that is conductive to alkali metal ions of the alkali metal comprising layer 16. Preferably, protective layer 18 does not conduct anions such as $S_8^=$ generated on discharge of a sulfur electrode (or other anions produced with other positive electrodes), or anions present in the electrolyte such as perchlorate ions from dissociation of lithium perchlorate.

In order to provide the needed ionic conductivity, the protective layer typically contains a mobile ion such as an alkali metal cation of the negative electrode metal. Many suitable single ion conductors are known. Among the suitable glasses are those that may be characterized as containing a "modifier" portion and a "network former" portion. The modifier is often an oxide of the alkali metal in layer 16 (i.e., the metal ion to which protective layer 18 is conductive). The network former is often a polymeric oxide or sulfide. One example is the lithium silicate glass 2 $Li_2O \cdot 1SiO_2$ and another example is the sodium borosilicate glass 2 $Na_2O \cdot 1SiO_2 \cdot 2B_2O_3$.

The modifier/network former glasses employed in this invention may have the general formula $(M_2O)X(A_nD_m)$, where M is an alkali metal, A is boron, aluminum, silicon, or phosphorous, D is oxygen or sulfur. The values of n and m are dependent upon the valence on A. X is a coefficient that varies depending upon the desired properties of the glass. Generally, the conductivity of the glass increases as the value of X decreases. However, if the value of X becomes too small, separate phases of the modifier and network former arise. Generally, the glass should remain of a single phase, so the value of X must be carefully chosen.

The highest concentration of $M_2O$ should be that which yields the stoichiometry of the fully ionic salt of the network former. For instance $SiO_2$ is a polymeric covalent material; as $Li_2O$ is added to silica O—O bonds are broken yielding Si—O $Li^+$. The limit of $Li_2O$ addition is at the completely ionic stoichiometry, which for silica would be $Li_4SiO_4$, or $2Li_2O \cdot SiO_2$ ($Li_2O \cdot 0.5SiO_2$). Any addition of $Li_2O$ beyond this stoichiometry would necessarily lead to phase separation of $Li_2O$ and $Li_4SiO_4$. Phase separation of a glass composition typically happens well before the fully ionic composition, but this is dependent on the thermal history of the glass and cannot be calculated from stoichiometry. Therefore the ionic limit can be seen as an upper maximum beyond which phase separation will happen regardless of thermal history. The same limitation can be calculated for all network formers, i.e. $Li_3BO_3$ or 3 $Li_2O \cdot B_2O_3$, $Li_3AlO_3$ or 3 $Li_2O \cdot Al_2O_3$, etc. Obviously, the optimum values of X will vary depending upon the modifier and network former employed.

Examples of the modifier include lithium oxide ($Li_2O$), lithium sulfide ($Li_2S$), lithium selenide ($Li_2Se$), sodium oxide ($Na_2O$), sodium sulfide ($Na_2S$), sodium selenide ($Na_2Se$), potassium oxide ($K_2O$), potassium sulfide ($K_2S$), potassium selenide ($K_2Se$), etc., and combinations thereof. Examples of the network former include silicon dioxide ($SiO_2$), silicon sulfide ($SiS_2$), silicon selenide ($SiSe_2$), boron oxide ($B_2O_3$), boron sulfide ($B_2S_3$), boron selenide ($B_2Se_3$), aluminum oxide ($Al_2O_3$), aluminum sulfide ($Al_2S_3$), aluminum selenide ($Al_2Se_3$), phosphorous pentoxide ($P_2O_5$), phosphorous pentasulfide ($P_2S_5$), phosphorous pentaselenide ($P_2Se_5$), phosphorous tetraoxide ($PO_4$), phosphorous tetrasulfide ($PS_4$), phosphorous tetraselenide ($PSe_4$), and related network formers.

"Doped" versions of the above two-part protective glasses may also be employed. Often the dopant is a simple halide of the ion to which the glass is conductive. Examples include lithium iodide (LiI), lithium chloride (LiCl), lithium bromide (LiBr), sodium iodide (NaI), sodium chloride (NaCl), sodium bromide (NaBr), etc. Such doped glasses may have general formula $(M_2O)X(A_nD_m) \cdot Y(MH)$ where Y is a coefficient and MH is a metal halide.

The addition of metal halides to glasses is quite different than the addition of metal oxides or network modifiers to glasses. In the case of network modifier addition, the covalent nature of the glass is reduced with increasing modifier addition and the glass becomes more ionic in nature. The addition of metal halides is understood more in terms of the addition of a salt (MH) to a solvent (the modifier/former glass). The solubility of a metal halide (MH) in a glass will also depend on the thermal history of the glass. In general it has been found that the ionic conductivity of a glass increases with increasing dopant (MH) concentration until the point of phase separation. However, very high concentrations of MH dopant may render the glass hygroscopic and susceptible to attack by residual water in battery electrolytes, therefore it might be desirable to use a graded interface where the halide concentration decreases as a function of distance from the negative electrode surface. One suitable halide doped glass is $Li_2OYLiClXB_2O_3ZSiO_2$.

Some other single ion conductor glasses may also be employed as a protective layer used with this invention. One example is a lithium phosphorus oxynitride glass referred to as LIPON which is described in "A Stable Thin-Film Lithium Electrolyte: Lithium Phosphorus Oxynitride," J. Electrochem. Soc., 144, 524 (1997) and is incorporated herein by reference for all purposes. An example composition for LIPON is $Li_{2.9}PO_{3.3}N_{0.5}$. Examples of other glass films that may work include 6LiI—$Li_3PO_4$—$P_2S_5$ and $B_2O_3$—$LiCO_3$—$Li_3PO_4$.

Regarding thickness, protective layer 18 should be as thin as possible while still effectively protecting the metal electrode. Thinner layers have various benefits. Among these are flexibility and low ionic resistance. If a layer becomes too thick, the electrode cannot bend easily without cracking or otherwise damaging the protective layer. Also, the overall resistance of the protective layer is a function of thickness. However, the protective layer should be sufficiently thick to prevent electrolyte or certain aggressive ions from contacting the underlying alkali metal. The appropriate thickness will depend upon the deposition process. If the deposition process produces a high quality protective layer, then a rather thin layer can be employed. A high quality protective layer will be smooth and continuous and free of pores or defects that could provide a pathway for lithium metal or deleterious agents from the electrolyte.

For many protective layers, the optimal thickness will range between about 50 angstroms and 5 micrometers. More preferably, the thickness will range between about 100 angstroms and 3,000 angstroms. Even more preferably, the thickness will range between about 500 angstroms and 2,000 angstroms. For many high quality protective layers, an optimal thickness will be approximately 1000 angstroms.

In addition, the composition of the protective layer should have an inherently high ionic conductivity (e.g., between about $10^{-8}$ and about $10^{-2}$ (ohm-cm)$^{-1}$). Obviously, if a relatively good quality thin layer can be deposited, a material with a relatively low conductivity may be suitable. However, if relatively thicker layers are required to provide adequate protection, it will be imperative that the composition of the protective layer have a relatively high conductivity.

Battery Design

Batteries of this invention may be constructed according to various known processes for assembling cell components and cells. Generally, the invention finds application in any cell configuration. The exact structure will depend primarily upon the intended use of the battery unit. Examples include thin film with porous separator, thin film polymeric laminate, jelly roll (i.e., spirally wound), prismatic, coin cell, etc.

Generally, batteries employing the negative electrodes of this invention will be fabricated with an electrolyte. It is possible, however, that the protective layer could serve as a solid state electrolyte in its own right. If a separate electrolyte is employed, it may be in the liquid, solid (e.g., polymer), or gel state. It may be fabricated together with the negative electrode as a unitary structure (e.g., as a laminate). Such unitary structures will most often employ a solid or gel phase electrolyte.

The negative electrode is spaced from the positive electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, plastic for example, with only the current collectors extending beyond the casing. Thereby, reactive elements, such as sodium or lithium in the negative electrode, as well as other cell elements are protected.

Figure 3:
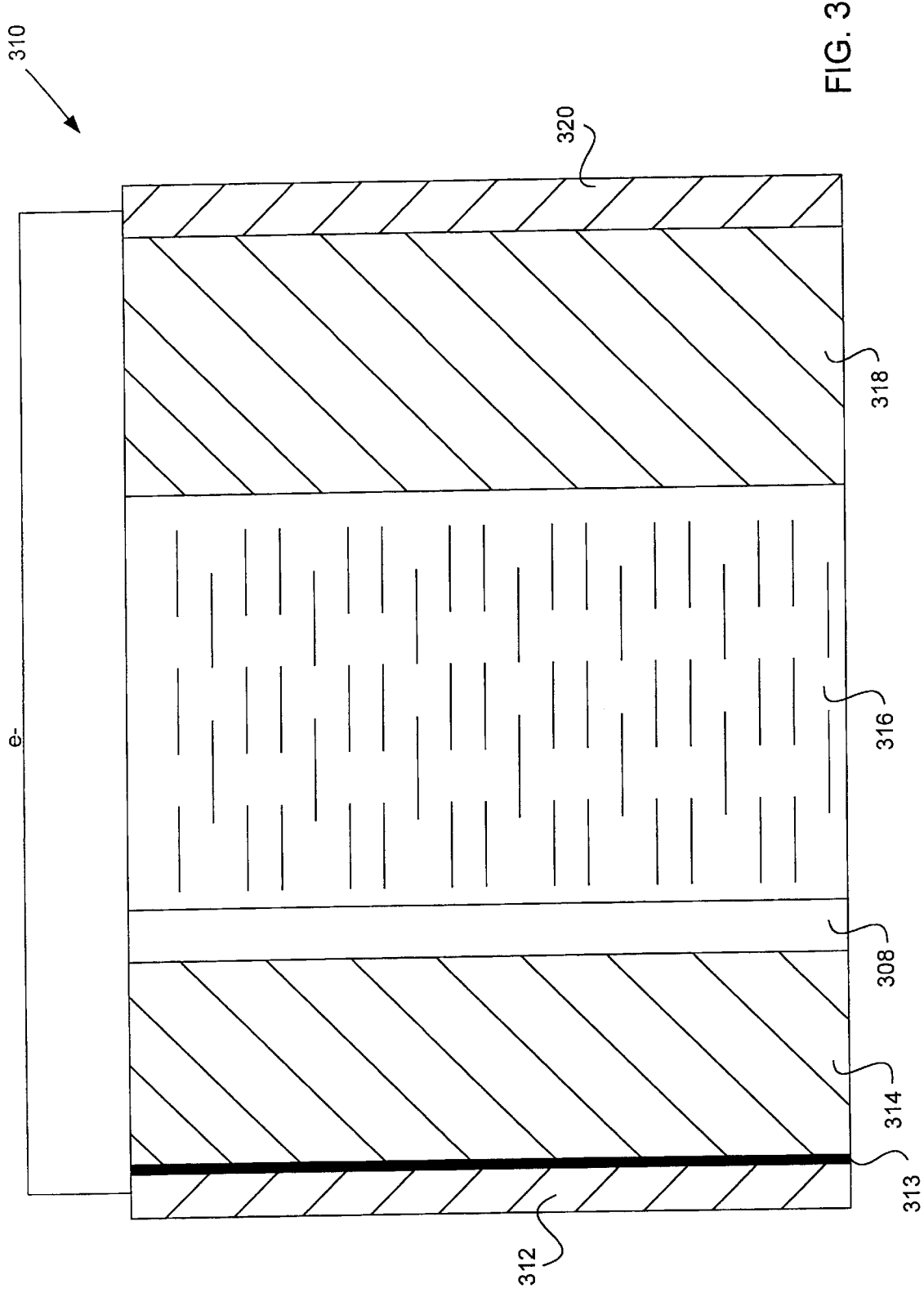
FIG. 3 is a block diagram of a battery formed from an electrode of the present invention.

Referring now to FIG. 3, a cell 310 in accordance with a preferred embodiment of the present invention is shown. Cell 310 includes a negative current collector 312 which is formed of an electronically conductive material. The current collector serves to conduct electrons between a cell terminal (not shown) and a negative electrode 314 (such as lithium) to which current collector 312 is affixed. Negative electrode 314 is made from lithium or other similarly reactive material, and includes a protective layer 308 formed opposite current collector 312. It contacts current collector 312 via a wetting layer 313. Either negative electrode 314 or protective layer 308 contacts an electrolyte in an electrolyte region 316. As mentioned, the electrolyte may be liquid, gel, or solid (e.g., polymer). To simplify the discussion of FIG. 3, the electrolyte will be referred to as "liquid electrolyte" or just "electrolyte."

An optional separator in region 316 prevents electronic contact between the positive and negative electrodes. A positive electrode 318 abuts the side of separator layer 316 opposite negative electrode 314. As electrolyte region 316 is an electronic insulator and an ionic conductor, positive electrode 318 is ionically coupled to but electronically insulated from negative electrode 314. Finally, the side of positive electrode 318 opposite electrolyte region 316 is affixed to a positive current collector 320. Current collector 320 provides an electronic connection between a positive cell terminal (not shown) and positive electrode 318.

Current collector 320, which provides the connection to the positive electrode, should resist degradation in the electrochemical environment of the cell and should remain substantially unchanged during discharge and charge. In one embodiment, the current collectors are sheets of conductive material such as aluminum or stainless steel. The positive electrode may be attached to the current collector by directly forming it on the current collector or by pressing a pre-formed electrode onto the current collector. Positive electrode mixtures formed directly onto current collectors preferably have good adhesion. Positive electrode films can also be cast or pressed onto expanded metal sheets. Alternately, metal leads can be attached to the positive electrode by crimp-sealing, metal spraying, sputtering or other techniques known to those skilled in the art. Some positive electrode can be pressed together with the electrolyte separator sandwiched between the electrodes. In order to provide good electrical conductivity between the positive electrode and a metal container, an electronically conductive matrix of, for example, carbon or aluminum powders or fibers or metal mesh may be used.

A separator may occupy all or some part of electrolyte compartment 316. Preferably, it will be a highly porous/permeable material such as a felt, paper, or microporous plastic film. It should also resist attack by the electrolyte and other cell components under the potentials experienced within the cell. Examples of suitable separators include glass, plastic, ceramic, and porous membranes thereof among other separators known to those in the art. In one specific embodiment, the separator is Celgard 2300 or Celgard 2400 available from Hoechst Celanese of Dallas, Tex.

In an alternative embodiment, no separator is employed. The protective layer on the negative electrode prevents the positive and negative electrodes from contacting one another and serves the function of a separator. In such cases, the protective layer should be tough. It may be relatively thick and made from a material that resists cracking and abrasion.

In some embodiments of the invention, the cell may be characterized as a "thin film" or "thin layer" cell. Such cells possess relatively thin electrodes and electrolyte separators. Preferably, the positive electrode is no thicker than about 300 $\mu$m, more preferably no thicker than about 1501 $\mu$m, and most preferably no thicker than about 100 $\mu$m. The negative electrode preferably is no thicker than about 100 $\mu$m and more preferably no thicker than about 100 $\mu$m. Finally, the electrolyte separator (when in a fully assembled cell) is no thicker than about 100 $\mu$m and more preferably no thicker than about 40 $\mu$m.

The present invention can be used with any of a number of battery systems employing a highly reactive negative electrode such as lithium or other alkali metal. For example, any positive electrode used with lithium metal or lithium ion batteries may be employed. These include lithium manganese oxide, lithium cobalt oxide, lithium nickel oxide, lithium vanadium oxide, etc. Mixed oxides of these compounds may also be employed such as lithium cobalt nickel oxide. As will be explained in more detail below, a preferred application of the electrodes of this invention is in lithium-sulfur batteries.

While the above examples are directed to rechargeable batteries, the invention may also find application in primary batteries. Examples of such primary batteries include lithium-manganese oxide batteries, lithium-$(CF)_x$ chloride batteries, lithium sulfur dioxide batteries and lithium iodine batteries. These batteries would normally have lithium plated ex situ, and then have a long shelf life due to the protective layer.

The protective layer allows one to use a reactive lithium metal electrode in a manner that resembles the use of lithium ion batteries. Lithium ion batteries were developed because they had a longer cycle life and better safety characteristics than metal lithium batteries. The relatively short cycle life of metallic lithium batteries has been due, in part, to the formation of dendrites of lithium which grow from the lithium electrode across the electrolyte and to the positive electrode where they short circuit the cells. Not only do these short circuits prematurely kill the cells, they pose a serious safety risk. The protective layer of this invention prevents formations of dendrites and thereby improves the cycle life and safety of metallic lithium batteries. Further, the batteries of this invention will perform better than lithium ion batteries because they do not require a carbon intercalation matrix to support lithium ions. Because the carbon matrix does not provide a source of electrochemical energy, it simply represents dead weight that reduces a battery's energy density. Because the present invention does not employ a carbon intercalation matrix, it has a higher energy density than a conventional lithium ion cell—while providing better cycle life and safety than metallic lithium batteries studied to date. In addition, the lithium metal batteries of this invention do not have a large irreversible capacity loss associated with the "formation" of lithium ion batteries.

Lithium-Sulfur Batteries

Sulfur positive electrodes and metal-sulfur batteries are described in U.S. Pat. No. 5,686,201 issued to Chu on Nov. 11, 1997 and U.S. patent application Ser. No. 08/948,969 naming Chu et al. as inventors, filed on Oct. 10, 1997. Both of these documents are incorporated by reference for all purposes. The sulfur positive electrodes preferably include in their theoretically fully charged state sulfur and an electronically conductive material. At some state of discharge, the positive electrode will include one or more polysulfides and possibly sulfides, which are polysulfides and sulfides of the metal or metals found in the negative electrode. In some embodiments, the fully charged electrode may also include some amount of such sulfides and/or polysulfides.

The positive electrode is fabricated such that it permits electrons to easily move between the sulfur and the electronically conductive material, and permits ions to move between the electrolyte and the sulfur. Thus, high sulfur utilization is realized, even after many cycles. If the lithium-sulfur battery employs a solid or gel state electrolyte, the positive electrode should include an electronic conductor (e.g., carbon) and an ionic conductor (e.g., polyethylene oxide) in addition to the sulfur electroactive material. If the battery employs a liquid electrolyte, the positive electrode may require only an electronic conductor in addition to the sulfur electroactive material. The electrolyte itself permeates the electrode and acts as the ionic conductor. In the case of a liquid electrolyte cell, the battery design may assume two formats: (1) all active sulfur (elemental sulfur, polysulfides and sulfides of the positive electrode) is dissolved in electrolyte solution (one phase positive electrode) and (2) the active sulfur is distributed between a solid phase (sometimes precipitated) and a liquid phase.

When the metal-sulfur battery cells of this invention include a liquid electrolyte, that electrolyte should keep many or all of sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units ($CH_2CH_2O$). This may be a glyme or related compound. Such solvents are believed to strongly coordinate lithium and thereby increase the solubility of discharge products of lithium-sulfur batteries. Suitable liquid electrolyte solvents are described in more detail in U.S. patent application Ser. No. 08/948,969, previously incorporated by reference.

It should be understood that the electrolyte solvents of this invention may also include cosolvents. Examples of such additional cosolvents include sulfolane, dimethyl sulfone, dialkyl carbonates, tetrahydrofuran (THF), dioxolane, propylene carbonate (PC), ethylene carbonate (EC), dimethyl carbonate (DMC), butyrolactone, Nmethylpyrrolidinone, dimethoxyethane (DME or glyme), hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, N,N,N',N'-tetraethylsulfamide, tetraethylenediamine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

The protective layers employed in this invention may allow the use of electrolyte solvents that work well with sulfides and polysulfides but may attack lithium. Examples of solvents in this category include amine solvents such as diethyl amine, ethylene diamine, tributyl amine, amides such as dimethyl acetamide and hexamethyl phosphoramide (HMPA), etc.

Exemplary but optional electrolyte salts for the battery cells incorporating the electrolyte solvents of this invention include, for example, lithium trifluoromethanesulfonimide ($LiN(CF_3SO_2)_2$), lithium triflate ($LiCF_3SO_3$), lithium perchlorate ($LiClO_4$), $LiPF_6$, $LiBF_4$, and $LiAsF_6$, as well as corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

As mentioned, the battery cells of this invention may include a solid-state electrolyte. An exemplary solid-state electrolyte separator is a ceramic or glass electrolyte separator which contains essentially no liquid. Specific examples of solidstate ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator generally containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator generally contains at least 20% (weight percentage) of an organic liquid (see the above listed liquid electrolytes for examples), with the liquid being immobilized by the inclusion of a gelling agent. Many gelling agents such as polyacrylonitrile, polyvinylidene difluoride (PVDF), or polyethylene oxide (PEO), can be used.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. Such separators are described in U.S. Pat. No. 3,351,495 assigned to W. R. Grace & Co. and U.S. Pat. Nos. 5,460,904, 5,540,741, and 5,607,485 all assigned to Bellcore, for example. Each of these patents is incorporated herein by reference for all purposes.

The fully charged state of some cells of this invention need not require that the positive electrode be entirely converted to elemental sulfur. It may be possible in some cases to have the positive electrode be a highly oxidized form of lithium polysulfide, for example, as in $Li_2S_x$ where x is five or greater. The fully charged positive electrode may also include a mixture of such polysulfides together with elemental sulfur and possibly even some sulfide. It should be understood that during charge, the positive electrode would generally not be of uniform composition. That is, there will be some amount of sulfide, sulfur, and an assortment of polysulfides with various values of x. Also, while the electrochemically active material includes some substantial fraction of "sulfur," this does not mean that the positive electrode must rely exclusively upon sulfur for its electrochemical energy.

The electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. Often such electronic conductors will be fibrous materials such as a felt or paper. Examples of suitable materials include a carbon paper from Lydall Technical Papers Corporation of Rochester, N.H. and a graphite felt available from Electrosynthesis Company of Lancaster, N.Y.

The sulfur is preferably uniformly dispersed in a composite matrix containing an electronically conductive material. Preferred weight ratios of sulfur to electronic conductor in the sulfur-based positive electrodes of this invention in a fully charged state are at most about 50:1, more preferably at most about 10:1, and most preferably at most about 5:1. The sulfur considered in these ratios includes both precipitated or solid phase sulfur as well as sulfur dissolved in the electrolyte. Preferably, the per weight ratio of electronic conductor to binder is at least about 1:1 and more preferably at least about 2:1.

The composite sulfur-based positive electrode may further optionally include performance enhancing additives such as binders, electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and protective layer forming additives to protect a lithium negative electrode (e.g., organosulfur compounds, phosphates, iodides, iodine, metal sulfides, nitrides, and fluorides). Preferred binders (1) do not swell in the liquid electrolyte and (2) allow partial but not complete wetting of the sulfur by the liquid electrolyte. Examples of suitable binders include Kynar available from Elf Atochem of Philadelphia, Pa., polytetrafluoroethylene dispersions, and polyethylene oxide (of about 900k molecular weight for example). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

The battery cells of this invention may be rechargeable "secondary" cells. Unlike primary cells which discharge only once, the secondary cells of this invention cycle between discharge and charge at least two times. Typically, secondary cells of this invention will cycle at least 50 times, with each cycle having a sulfur utilization (measured as a fraction of 1675 mAh/g sulfur output during the discharge phase of the cycle) of at least about 10%. More preferably, at least 50 cycles will have a minimum sulfur utilization of at least about 20% (most preferably at least about 30%). Alternatively, the secondary cells of this invention will cycle at least two times, with each cycle attaining at least 50% utilization of sulfur in the positive electrode.

The use of an in situ process for forming a lithium electrode in a lithium-sulfur cell in accordance with this invention provides a simple mechanism for controlling the oxidation state of the positive electrode during normal cell cycling. For example, the designer may design the cell so that very little if any highly reduced species such as lithium sulfide are produced during cycling. This may be accomplished by using a relatively highly oxidized species (e.g., $Li_2S_2$) as the source of lithium (positive electrode) for in situ lithium negative electrode formation. Since all the lithium in the cell originally came from $Li_2S_2$, the positive electrode of a fully discharged cell will have species whose average oxidation state corresponds to $Li_2S_2$. This prevents formation of $Li_2S$ in any significant quantity. Note that highly reduced species such as $Li_2S$ are relatively insoluble in comparison to more highly oxidized species and therefore may be undesirable with liquid electrolyte cells. That is, many cell designs require that most or all sulfur species remain in solution. If sulfur reduces in an insoluble form (e.g., $Li_2S$ or a related species), it may lose electrical contact with the electrode/current collector and thereby become unavailable for electrochemical reaction. This reduces the cell's capacity and energy density.

Figure 4:
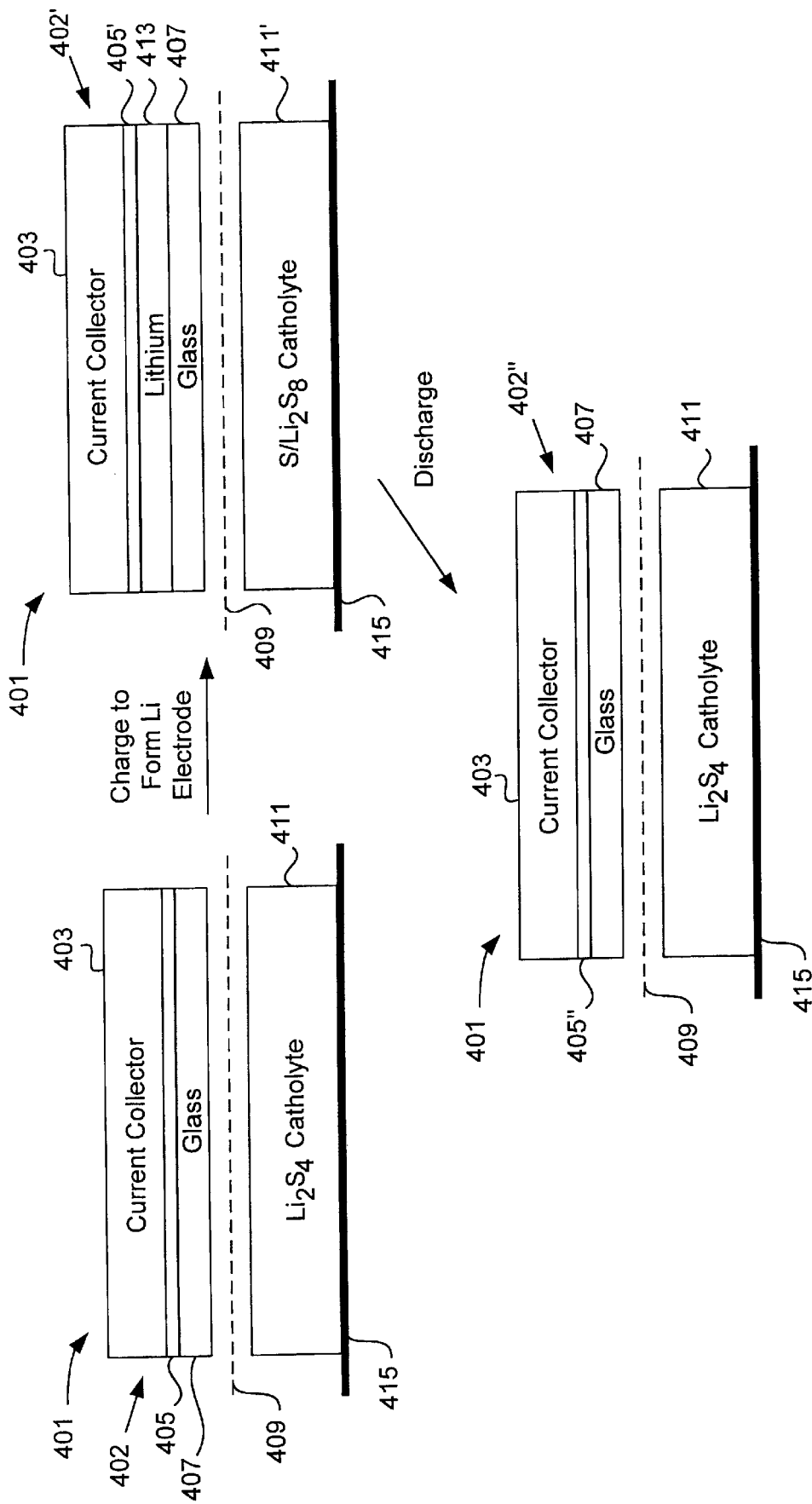
FIG. 4 is a schematic illustration of the oxidation states of a sulfur catholyte during in situ lithium electrode formation and subsequent cycling.

FIG. 4 schematically illustrates the general concept of controlling the oxidation state of the positive electrode. Initially, a cell 401 is assembled. It includes a negative electrode precursor 402, a separator 409, and a cathode/catholyte 411. Catholyte 411 is a solution of $Li_2S_4$ which permeates through separator 409 to contact protective layer 407. It also contacts a positive electrode 415 which may be a carbon mesh or mat in contact with an aluminum current collector. Electrode precursor 402 includes a current collector 403 (e.g., a copper sheet), a wetting layer 405 (e.g., aluminum), and a lithium conducting glass protective layer 407.

When cell 401 is ready for its initial use, it is charged to form the lithium electrode. This results by applying a negative potential to current collector 403 and a positive potential to current collector 415. Positively charged lithium ions leave the $Li_2S_4$, pass through glass ion conductor 407, and reduce to lithium metal on current collector 403 and there alloy with aluminum from layer 405. As shown in FIG. 4, a lithium electrode 402' forms. It includes a lithium layer 413 located between glass protective layer 407 and current collector 403. It contacts current collector 403 through an Al/Li alloy 405'.

The charging that produces lithium electrode 402' also oxidizes the catholyte species to a higher average oxidation state than $Li_2S_4$. For example, it may produce a charged catholyte 411' which contains highly oxidized polysulfide species such as $Li_2S_8$ as well as possibly elemental sulfur.

Fully charged lithium-sulfur 401 may be discharged to produce useful electrochemical energy. During discharge, negative electrode 402' is gradually oxidized and the lithium metal in layer 413 converts to lithium ions which move through protective layer 407 and into catholyte 411'. The highly oxidized polysulfides and elemental sulfur are reduced by reaction with the lithium ions liberated by negative electrode 402'. As a result, the catholyte species decrease in average oxidation state.

As shown in FIG. 4, the normal discharged state of cell 401 includes discharged negative electrode 402" and catholyte 411. Note that electrode 402" no longer includes lithium layer 413 as it has been consumed. As a result electrode 402" includes current collector 403, Li/Al wetting layer 405", and protective layer 407. Catholyte 411 includes reduced polysulfide species such as $Li_2S_4$. Note that in the original cell, $Li_2S_4$ was chosen for the catholyte so that the sulfur compounds always have a relatively high oxidation state (greater than $Li_2S$) even during full discharge. Thus, all sulfur species tend to remain in solution, as they never reach an oxidation state approaching $Li_2S$.

Subsequent charge/discharge cycles convert the negative electrode between charged state 402' in which a layer of lithium 413 forms and discharged state 402" in which some or all of layer 413 is consumed. That same cycling converts the catholyte between charged state 411' in which oxidized species such as elemental sulfur and $Li_2S_8$ form and discharged state 411 in which reduced species such as $Li_2S_4$ which form. However, strongly reduced (less soluble) species such as $Li_2S$ do not form.

Figure 5:
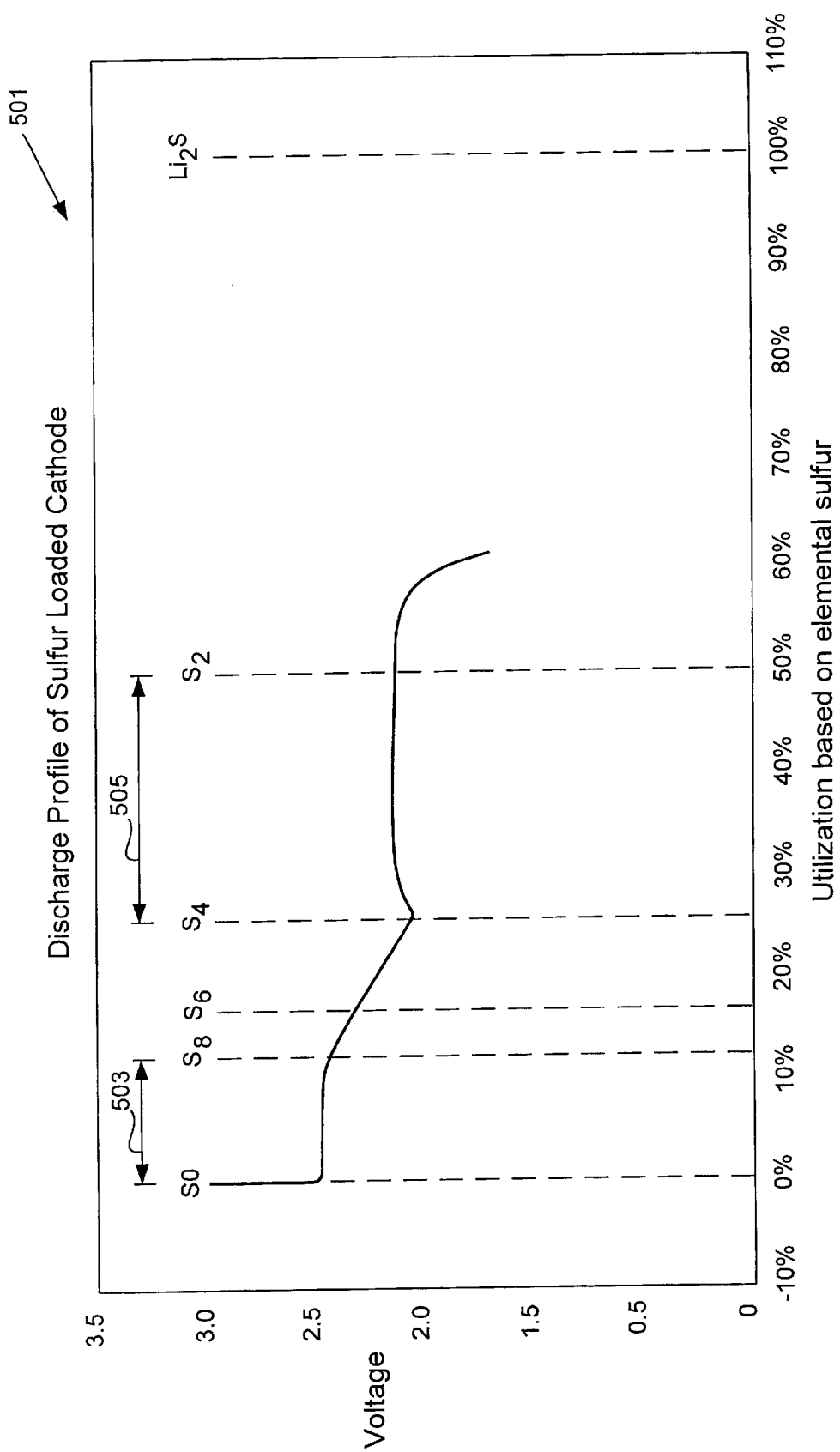
FIG. 5 is a graph of cell potential versus state of charge for a sulfur catholyte of a lithium-sulfur cell.

FIG. 5 is a graph 501 of cell potential versus state of charge for a sulfur catholyte of a typical lithium-sulfur cell. The cell voltage (abscissa) is a function of the state of charge (ordinate) of the sulfur cathode/catholyte. The slope of the graph reflects the fact that different sulfur containing species have different redox potentials versus lithium species. A lithium-sulfur cell having 100 percent sulfur as the cathode/catholyte will have a cell voltage of approximately 2.5 volts. As that cell discharges, the catholyte state of charge (and composition) changes so that polysulfides are formed and the cell potential decreases. The potential curve has a shoulder at a cathode/catholyte average composition of about $Li_2S_8$ as illustrated in the graph. The curve remains relatively flat during further reduction in charge state until the average composition reduces below about $Li_2S_2$, at which point the potential drops rapidly until the fully reduced state ($Li_2S$) is reached.

A lithium sulfur cell design may limit range of the Li–S potential curve over which the cell operates between charge and discharge. The size of the range depends upon the relative amounts of lithium and sulfur in the system. When the relative amount of lithium is low the potential range of the cell is narrow. When the relative amount of lithium is high the potential range of the cell is large.

Bars 503 and 505 represent two different lithium-sulfur cells. Cell 503 has a relatively small range implying a relatively low ratio of Li:S, while cell 505 has a wider range implying a higher ratio of Li:S. In situ cells in which the initial source of lithium is a lithium rich highly reduced sulfur species (e.g., $Li_2S$), the potential range is greater.

In addition, the relative position of the potential range on the overall Li–S potential curve depends upon the composition of the starting lithium source. More highly oxidized species (e.g., a mixture including $Li_2S_4$ and $Li_2S_6$) in the lithium source provide cells which operate further to the left on the potential curve of FIG. 4.

EXAMPLES

The following results have been observed:

1. In an aprotic solvent in the presence of lithium polysulfide, as in the catholyte described, shiny lithium can be electroplated through the LIPON layer onto the copper surface (example 1). Under similar conditions, electroplating onto uncovered copper foil did not yield any lithium coating.
2. This lithium-plated LIPON/copper structure is a useable anode. Example 2 demonstrates its cyclability in the presence of the catholyte.
3. This plated lithium is also essentially totally anodeactive. Example 3 demonstrates the availability of lithium after twenty cycles is at least 98% of the original anode-active lithium.

An experimental system was prepared as follows. A LIPON/copper composite was made by sputtering LIPON on a copper film, similar to a process described by Bates et. al. in Solid State Ionics, 53–56 (1992), 647–654 which is incorporated herein by reference for all purposes. A LIPON target was made via simple fusion. A LIPON target pre-form was made by heating 11.5 gm. of lithium phosphate powder purchased from Alfa Aesar to 1250 deg.C (80 deg. C/min heating rate) in a 95/5 Pt/Au crucible (diameter 34 mm. at base, wall slightly tapered), holding at that temperature for 15 minutes, followed by cooling at 80 deg C/min until the temperature dropped below 300 deg.C. This pre-form was sized to a desirable shape with a "medium" Drywall Screen by 3M. The weight of the finished target was about 9.5 gm.

A 1.3" Minimak sputtering head (manufactured by US Inc.) powered by a RF10 power supply (by RF Plasma Products) was used to sputter the LIPON onto Cu foil (0.01 mm thick, by Schlank). The particular conditions for this run were 20 milli-torr nitrogen, at a nitrogen flow rate of 20 sccm, RF power of 75 watts forward, 0 watt reflected, target to substrate distance of 8 cm, and duration of 58 minutes. Under such conditions of sputtering, apparently LIPON was reactively formed on the substrate surface.

A cells were constructed with the LIPON/Cu anode precursor, a polypropylene separator (0.58 mm thick, by Hollensworth Vose) which also serves as the catholyte reservoir, and a C/Al cathode current collector. The Cu piece was about 2 cm.×2 cm, while the other components are about 1 cm×1 cm. The copper side was placed on the anode lead plate, while a stainless steel plate (ca 1 cm×1 cm), under a light spring tension, served as the cathode contact. The cells, unless otherwise noted, were filled with a catholyte, a lithium sulfide solution in tetraglyme containing 3 moles sulfur and 0.75 moles lithium/liter, with 0.5 moles/liter lithium trifluoromethanesulfonimide as supporting electrolyte. The cells were designed to seal easily and be disassembled easily. Electrical maneuvering and measurements were performed on a Maccor cell cycler.

EXAMPLES

1. Cell #D042 was constructed as described above. It was charged at 100 microamperes for one hour. It was then disassembled. A uniform, shiny lithium film on the copper surface could easily be seen through the transparent LIPON glass layer. A parallel experiment was conducted in which the only variance was that the copper foil was not LIPON coated. This did not yield any lithium coat, either by voltage indications during charging or by physical observation upon disassembly.

2. Cell #D049 was constructed as described above. It was charged at 100 microamperes for 2 hours. It was then cycled at 100 microamperes for 15 minutes discharge followed by 15 minutes charge, for 100 cycles. Except for a minimal rise and fall of apparent cell internal resistance, much of which is attributable to the change of ambient temperature, the cell behaved remarkably constantly throughout the cycling.

Figure 6:
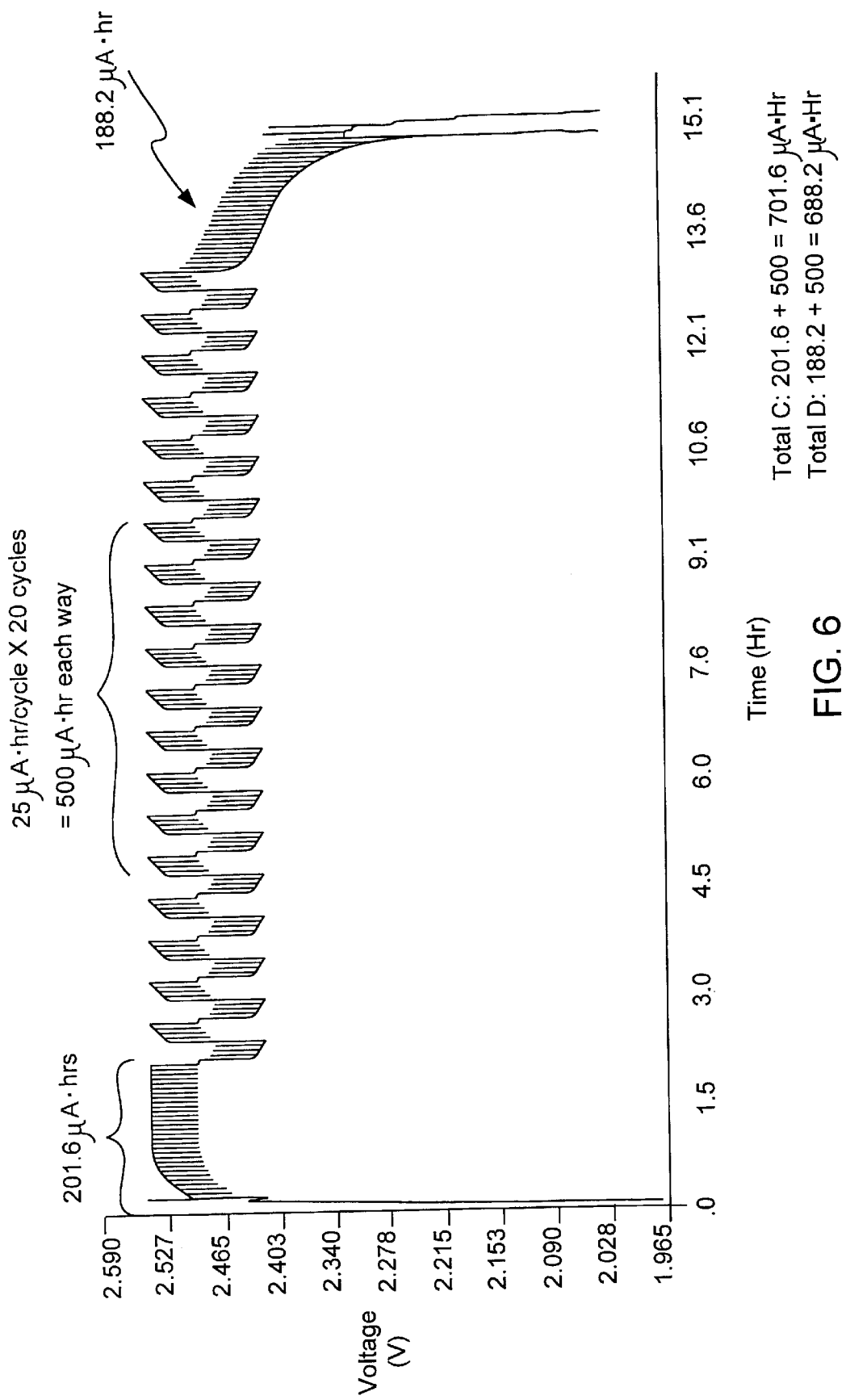
FIG. 6 is a graph illustrating that after twenty charge/discharge cycles, nearly all of the lithium in an electrode prepared according to this invention remained in the electrode.

3. Cell #D111 was constructed as described above, except the sputtering process was conducted for 85 minutes at 78 watts forward power. It was initially electrically determined to be void of metallic lithium on the copper anode surface. The cell was then charged at 10 microamperes for 10 min, then at 100 microamperes for 2 hours, then cycled at 100 microamperes, 15 min discharge/15 min charge, for 20 cycles. The cell was then put on a strip mode, when it was discharged at 100 microamperes until the closed circuit potential reaches 2.0 V, at which time the current was decreased to 20 microamperes, to a closed circuit potential of 2.0 V. This stripping step integrated to 188.2 microampere-hr., indicating a minimum of 188.2 microampere -hr of anode-active Li remained at the end of cycling. In other words, after a total of 201.6 microampere-hr of initially plated lithium was cycled 20 times at 25 microampere-hr per cycle, a minimum of 188.2 microampere-hr remained available. To put it another way, a total of 701.6 (201.6+20 cycles×25/cycle) microamperes/hr of Li was electroplated onto the copper anode, and at least 688.2 (188.2+20 cycles×25/cycle) microampere-hr of discharge was logged. See FIG. 6. The term "minimum" must be stressed, since obviously, from the definition of the endpoint of the strip step used, there still is unused lithium available at the end of the strip step.

Other Embodiments

The foregoing describes the instant invention and its presently preferred embodiments. Numerous modifications and variations in the practice of this invention are expected to occur to those skilled in the art. For example, the invention may provide overcharge protection as described in U.S. patent application Ser. No. 08/686,609, filed Jul. 26, 1996, and entitled RECHARGEABLE POSITIVE ELECTRODES and U.S. patent application Ser. No. 08/782,245, filed Mar. 19, 1997, and entitled OVERCHARGE PROTECTION SYSTEMS FOR RECHARGEABLE BATTERIES. Such modifications and variations are encompassed within the following claims.

All references cited herein are incorporated by reference for all purposes.

What is claimed is:

1. A method of fabricating an electrode, the method comprising:
    (a) providing an electrode precursor in an electroebeinical cell, the electrode precursor including a current collector, a material tat intercalates ions of an alkali metal, and a glassy or amorphous protective layer fanning a substantially impervious non-swellable layer which is a single ion conductor conductive to ions of the alkali metal; and
    (b) electrolytically transporting ions of the alkali metal through the protective layer to intercalate into the material tat intercalates ions of an alkali metal to form the electrode.

2. The method of claim 1, wherein the electrochentical cell is a discharged battery and wherein electrolytically transporting the alkali metal ions to form the electrode is an initial charging operation.

3. The method of claim 2, wherein the battery is a primary battery.

4. The method of claim 1, further comprising (c) removing the electrode from the electrochemical cell.

5. The method of claim 4, further comprising (d) assembling a battery including the electrode.

6. The method of claim 1, wherein the material that intercalates ions of the alkali metal is selected from the group consisting of carbon, titanium sulfide, and iron sulfide.

7. The method of claim 6, wherein the maerial that intercalates ions of the alkali metal is carbon.

8. An electrode precursor comprising:
    a current collector;
    a glassy or amorphous protective layer forming a substantially impeivious non-swellable layer which is a single ion conductor conductive to ions of an alkali metal; and
    a material that intercalates ions of the alkali metal located between and adherent to the current collector and the protective layer;
    wherein the electrode precursor does not comprise an alkali metal.

9. The alkali metal electrode precursor of claim 8, wherein the current collector is a layer of metal.

10. The alkali metal electrode precursor of claim 8, wherein the metal in the layer of metal is selected from the group consisting of copper, nickel, stainless steel, and zinc.

11. The alkali metal electrode precursor of claim 8, wherein to current collector is a metallized plastic sheet.

12. The alkali metal electrode precursor of claim 8, wherein the material that intercalates ions of the alkali metal is selected from the group consisting of carbon, titanium sulfide, and iron sulfide.

13. The alkali metal electrode precursor of claim 8, wherein the material that intercalates ions of the alkali metal is carbon.

14. The alkali metal electrode precursor of claim 8, wherein protective layer is conductive to lithium ions.

15. The alkali metal electrode precursor of claim 8, wherein protective layer includes at least one of a lithium silicate, a lithium borate, a lithium aluminate, lithium oxide, a lithium phosphate, a lithium phosphorus oxynitride, a lithium silicosulfide, a lithium borosulfide, a lithium aluminosullide, and a lithium phosphosulfide.

16. The alkali metal electrode precursor of claim 8, wherein the protective layer has a thickness of between about 50 angstroms and 5 micrometers.

17. The alkali metal electrode precursor of claim 16, wherein the protective layer has a thickness of between about 500 angstroms and 2000 angstroms.

18. The alkali metal electrode precursor of claim 8, wherein the protective layer has an ionic conductivity of between about $10^{-8}$ and about $10^{-2}$ (ohm-cm)$^{-1}$.

19. A battery or a battery precursor comprising:
    a) a positive electrode comprising a source of mobile alkali metal ions on charge;
    b) a precursor to an alkali metal negative electrode including
        a current collector,
        a glassy or amorphous protective layer forming a substantially impervious non-swellable layer which ii a single ion conductor conductive to ions of an alkali metal, and
        a layer of material that intercalates ions of the alkali metal located between and adherent to the current collector and the protective layer; and
    c) an electrolyte;
    wherein the precursor does not include an alkali metal.

20. The battery or battery precursor of claim 19, wherein the alkali metal comprises at least one of lithium and sodium.

21. The battery or battery precursor of claim 19, wherein the protective layer includes at least one of a lithium silicate, a lithium borate, a lithium aluminate, a lithium phosphate, a lithium phosphor nitride, a lithium silicosulfide, a lithium borosulfide, a lithium aluminosulfide, and a lithium phosphosulfide.

22. The battery or battery precursor of claim 19, wherein the protective layer has a thickness of between about 50 angstroms and 3000 angstroms.

23. The battery or battery precursor of claim 19, wherein the electrolyte is a liquid electrolyte.

24. The battery or battery precursor of claim 19, wherein the electrolyte is a polymer or gel electrolyte.

25. The battery or battery precursor of claim 19, wherein the positive electrode includes an electrochemically active metal oxide.

26. A method of fabricating a battery, the method comprising:
   (a) providing an electrode precursor in an electrochentical cell, the electrode precursor comprising (i) a current collector, (ii) a glassy or amorphous protective layer forming a substantially impervious non-swellable layer which is a single ion conductor conductive to ions of an alkali metal, and (iii) sandwiched between the current collector and the protective layer, a material that intercalates ions of the alkali metal;
   (b) providing a positive electrode; and
   (c) transporting alkali metal ions through the protective layer to intercalate alkali metal ions into the intercalation material and form the battery.

27. The method of claim 26, wherein the electrochentical cell is a discharged battery and wherein transporting the alkali metal ions to form the electrode is an initial charging operation.

28. The method of claim 27, wherein the discharged battery is a secondary battery.

29. The method of claim 26, wherein the positive electrode is a metal oxide electrode.

30. The method of claim 29, wherein the positive electrode is selected from the group consisting of lithium manganese oxide, lithium cobalt oxide, lithium nickel oxide, lithium vanadium oxide, and mixed oxides of any of these compounds.

* * * * *